United States Patent [19]
Barchok

[11] 3,931,548
[45] Jan. 6, 1976

[54] OVER VOLTAGE PROTECTION CIRCUIT
[75] Inventor: Donald J. Barchok, Chicago, Ill.
[73] Assignee: Admiral Corporation, Chicago, Ill.
[22] Filed: Apr. 26, 1974
[21] Appl. No.: 464,301

[52] U.S. Cl. ............ 317/33 VR; 317/33 R; 321/11
[51] Int. Cl.² ......................................... H02H 7/10
[58] Field of Search .................. 317/51, 31, 33 VR;
  315/380, 381; 178/7.5 R, DIG. 11; 321/2, 11

[56] References Cited
UNITED STATES PATENTS

| | | | |
|---|---|---|---|
| 3,395,313 | 7/1968 | Rogers | 178/DIG. 11 |
| 3,611,002 | 10/1971 | Wedham | 178/7.5 R X |
| 3,621,123 | 11/1971 | Hirota et al. | 178/DIG. 11 |
| 3,814,851 | 6/1974 | Yutaka et al. | 178/DIG. 11 |
| 3,828,239 | 8/1974 | Nagal et al. | 178/7.5 R X |

*Primary Examiner*—J. D. Miller
*Assistant Examiner*—Patrick R. Salce

[57] ABSTRACT

An over voltage protection circuit for preventing excessive high voltages which exceed the X-ray isodose limits for human beings when the high voltage primary winding, the tuning coil, or the high voltage primary driving winding opens. The B+ voltage for the driving oscillator or horizontal driver is derived at a point in the circuit such that when circuit elements fail, the B+ voltage is removed thus turning off the drive to the high voltage circuit.

2 Claims, 3 Drawing Figures

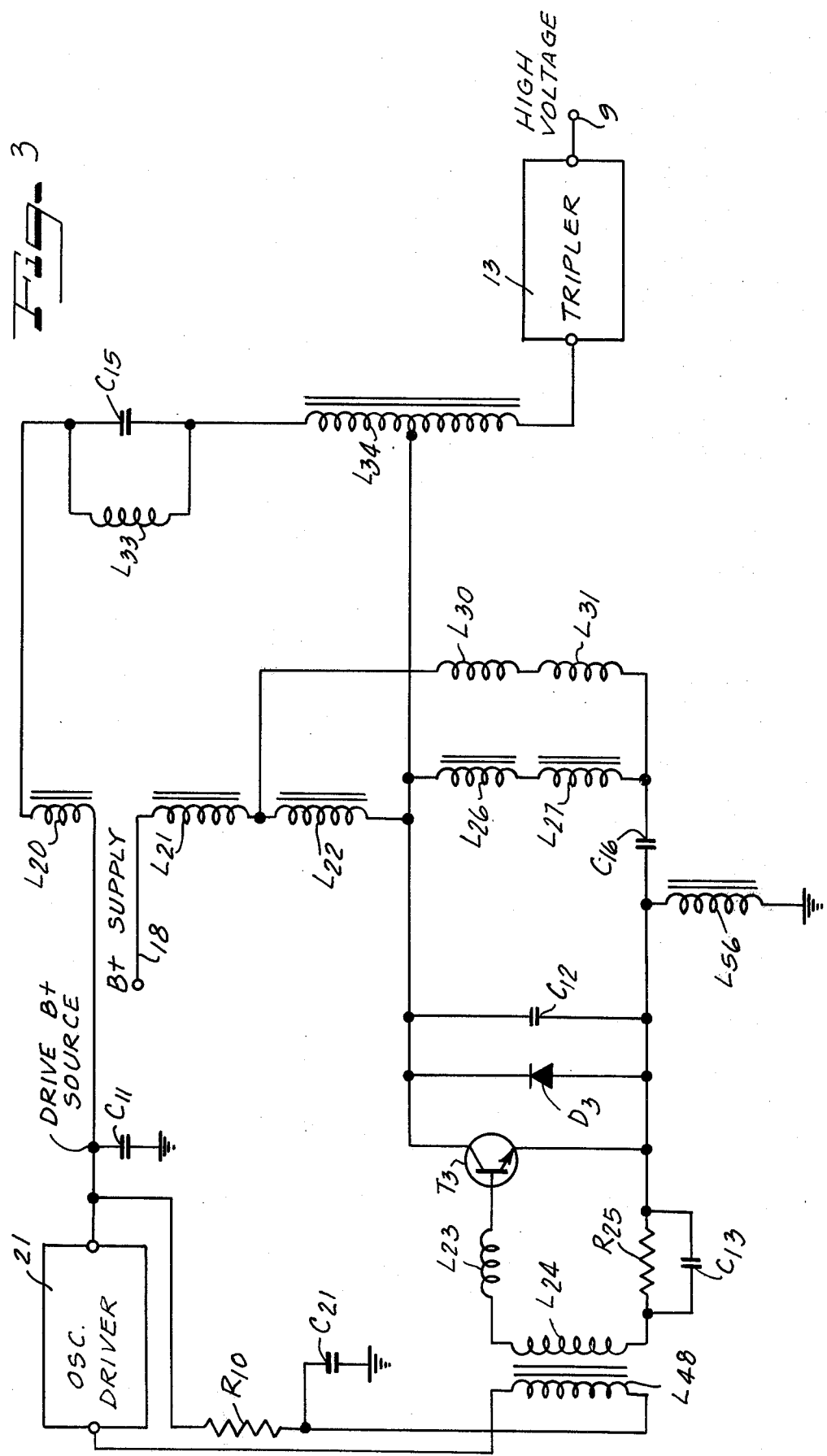

OVER VOLTAGE PROTECTION CIRCUIT

BACKGROUND OF THE INVENTION

1. Field of the Invention

This invention relates in general to protection circuits and in particular to an overvoltage protection circuit for high voltage television circuits.

2. Description of the Prior Art

In television sets the horizontal output transformer has been driven in a manner such that in the event the high voltage primary winding or the tuning coil of a harmonically tuned high voltage transformer open circuits, the high voltage rises to values far above the X-ray isodose limits. Such condition is dangerous to human beings as exposure to excessive high radiation dosage is unsafe.

SUMMARY OF THE INVENTION

The present invention provides a protection circuit such that in the event of failure of circuit elements such as the high voltage primary winding, the tuning coil of a harmonically tuned high voltage transformer, and/or the high voltage primary driving winding will result in the B+ voltage for one of the driving circuits going to zero or to a low value so as to turn off the driving circuit thus eliminating the production of unsafe high voltages which would cause X-ray radiation above the safe limits.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

BRIEF DESCRIPTION OF THE DRAWINGS

FIG. 3 is a schematic view of a modification of the invention.

DESCRIPTION OF THE PREFERRED EMBODIMENTS

Figures 1, 2:
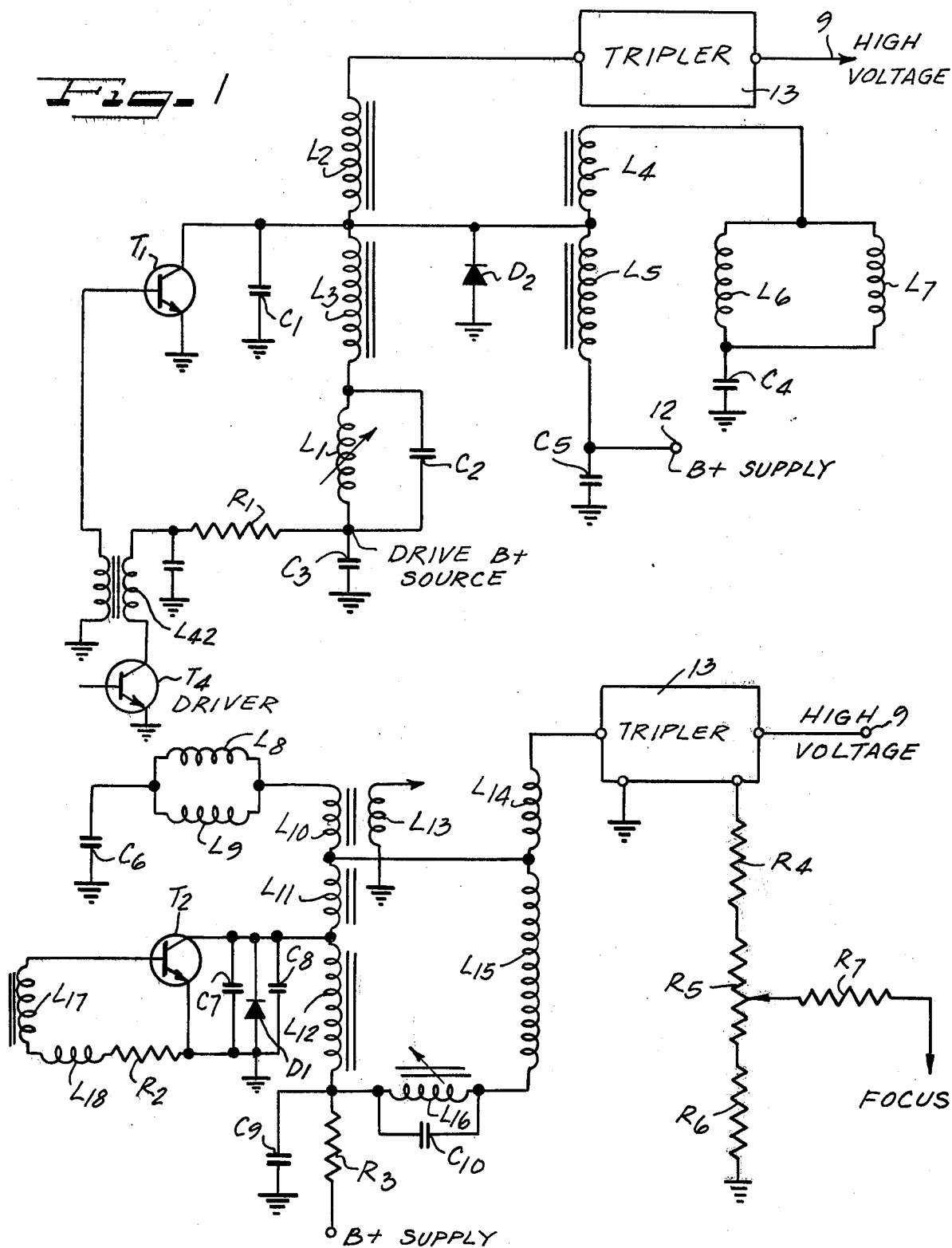
FIG. 1 is a schematic view of the improved invention.
FIG. 2 illustrates the prior art circuit.

FIG. 2 is an electrical schematic of a prior art circuit in which a horizontal output transistor $T_2$ has its emitter electrode connected by diode $D_1$ to its collector. An inductor $L_{18}$, and an inductor $L_{17}$ are connected in series between the emitter and the base. Inductor $L_{17}$ is the secondary of a transformer and the primary is connected to a suitable driving voltage not shown. A pair of condensers $C_7$ and $C_8$ are connected in parallel between the collector and emitter of transistor $T_2$. The collector of transistor $T_2$ is coupled through winding $L_{11}$ to winding $L_{15}$ which is the high voltage primary and to winding $L_{14}$ which is connected to the end of $L_{15}$ and which supplies a tripler 13 that provides a high voltage output on terminal 9. Resistors $R_4$, $R_5$, and $R_6$ are connected between one terminal of the tripler 13 and ground and a wiper contact 15 engages resistor $R_5$ and is connected to focus control through a resistor $R_7$. A tuning coil $L_{16}$ is connected in parallel with a capacitor $C_{10}$ and has one side connected to $L_{15}$ and the other side connected to $L_{12}$ which has its opposite end connected to the collector of transistor $T_2$. A condenser $C_9$ is connected between a junction point between the tuning coil and inductor $L_{12}$ and ground. A resistor $R_3$ is connected from the tuning coil $L_{16}$ to an inductor $L_{41}$ and has its other side connected to the collector of transistor $T_2$ to supply B+ voltage. A capacitor $C_6$ has one side connected to ground and the other side connected to parallel connected yokes $L_8$ and $L_9$ which have their other side connected to one end of winding $L_{10}$ which has its other side connected to winding $L_{11}$. A convergence output is provided by winding $L_{13}$ connected between ground and an output convergent point.

In the circuit shown, the voltage at the junction point between windings $L_{14}$ and $L_{15}$ might be 1140 volts, and the voltage at the junction between the yokes $L_8$ and $L_9$ and the winding $L_{10}$ might be 1280 volts. If the tuning coil winding $L_{16}$ opens or if the high voltage primary winding $L_{15}$ opens, a B+ will still be derived from the resistor $R_3$ and will keep transistor $T_2$ turned on; however, the high voltage output of the tripler will go far above the X-ray isodose limits which produces a dangerous hazard to humans and animals under this condition.

The present invention eliminates this hazard with the circuits illustrated in FIGS. 1 and 3 which are two different modifications and utilize the features wherein in the event a faulty high voltage primary or tuning coil exists, the turn-on B+ voltage to the horizontal driver will be turned off such that the dangerous high voltage does not cause X-ray radiation so as to endanger life.

FIG. 1 illustrates the embodiment of the invention wherein a horizontal output transistor $T_1$ receives a driving signal on its base and has its emitter connected to ground. Its collector is connected to drive the horizontal output transformer comprising windings $L_2$, $L_3$, $L_4$, and $L_5$. Tripler 13 is connected to the end of winding $L_2$ and provides high voltage output at its output terminal 9. The yoke comprises windings $L_6$ and $L_7$ connected in parallel between the winding $L_4$ and a capacitor $C_4$ which has its opposite side connected to ground. One end of the winding $L_5$ is connected to ground through a capacitor $C_5$ and the B+ voltage is applied to terminal 12 between capacitor $C_5$ and winding $L_5$. A tuning circuit comprises inductor $L_1$ and capacitor $C_2$ connected in parallel between one end of winding $L_3$ and a capacitor $C_3$ which is connected between ground and one end of winding $L_1$ and this junction point supplies horizontal driver B+ voltage through a resistor $R_1$ and a winding $L_{42}$.

If the high voltage primary winding $L_3$ opens or the inductor tuning coil $L_1$ opens, the B+ voltage for the horizontal driver $T_4$ goes to a value which will turn off transistor $T_4$ thus assuring that in the event of the failure of the high voltage winding or the tuning coil $L_1$, dangerous X-ray radiation does not occur.

A modification of the invention is illustrated in FIG. 3, wherein oscillator, driver 21 receives its supply voltage through $L_{48}$, $R_{10}$ and primary driving winding $L_{20}$ which has its other side connected to the coil $L_{33}$ and condenser $C_{15}$ connected in parallel. The other side of the coil $L_{33}$ is connected to the high voltage primary $L_{34}$ which has its other end connected to the tripler 13 which supplies high voltage output at terminal 9. The midpoint of the high voltage primary $L_{34}$ is connected to a collector of transistor $T_3$ which is the horizontal output transistor and which has its emitter connected to the parallel connected resistor $R_{25}$ and capacitor $C_{13}$ with the opposite end connected to a winding $L_{24}$ which has its other end connected to the base of transistor $T_3$ through the inductor $L_{23}$. A diode $D_3$ is connected between the emitter and collector of transistor $T_3$. A condenser $C_{12}$ is connected in parallel with the diode $D_3$. Yoke windings $L_{26}$ and $L_{27}$ are connected between the collector of transistor $T_3$ and a condenser $C_{16}$ which has its opposite side connected to the emitter of transistor $T_3$. A winding $L_{56}$ is connected between the emitter of transistor $T_3$ and ground. A source power B+ point 18 is connected to a suitable B+ source and is connected to one end of winding $L_{21}$ which has its other end connected to winding $L_{22}$ which is connected to the collector of transistor $T_3$ and to the A point of winding $L_{34}$. Windings of the yokes $L_{30}$ and $L_{31}$ are connected between the capacitor $C_{16}$ and the connection point between windings $L_{21}$ and $L_{22}$.

A winding $L_{48}$ has one end connected to the oscillator, driver 21, and its other side connected to ground through a capacitor $C_{21}$. A resistor $R_{10}$ is connected from winding $L_{48}$ to the oscillator, driver 21 to supply B+ voltage.

The oscillator, driver 21 receives current through the high voltage primary driving winding $L_{20}$, the tuning coil $L_{33}$, the high voltage winding $L_{34}$, and if any of these windings open, the B+ source to oscillator, driver 21 is turned off and the oscillator driver is rendered inactive such that high voltage does not cause X-ray radiation which is hazardous to personnel.

It is seen that this invention provides means for assuring that high level X-ray radiation does not occur in the event of failure of components in a high voltage circuit thus assuring the safety of personnel. Although the invention has been described with respect to preferred embodiments, it is not to be so limited as changes and modifications may be made which are within the full intended scope as defined by the appended claims.

I claim as my invention:

1. An overload protection circuit for a high voltate television circuit comprising an oscillator driver, a high voltage primary driving winding connected to said oscillator driver, a tuning coil connected in series with said high voltage primary driving winding, a high voltage primary connected in series with said tuning coil and driving winding, a horizontal driver connected to said high voltage primary, a B+ source connected in series with said primary driving winding, said tuning coil, and said high voltage primary and connected to said oscillator driver to provide supply voltage therefor.

2. An overload protection circuit for a high voltage circuit for a television receiver comprising, a horizontal driver transistor, a horizontal output transistor, a high voltage transformer connected to said horizontal output transistor, a tuning coil, a B+ voltage source, a high voltage primary driving winding connected in series with said tuning coil and said high voltage transformer, said B+ source being removed from said horizontal driver transistor if said driving winding, said tuning coil or said high voltage transformer open circuit, and conductor means connecting said B+ voltage source to said horizontal driver transistor.

* * * * *